111 United States Patent [11] 3,629,572

[72] Inventor Cornelius A. Gallagher
 Syosset, N.Y.
[21] Appl. No. 1,219
[22] Filed Jan. 7, 1970
[45] Patented Dec. 21, 1971
[73] Assignee Servo Corporation of America
 Hicksville, N.Y.

[54] HOT BOX DETECTOR ALARM MONITOR
 6 Claims, 4 Drawing Figs.
[52] U.S. Cl. .................................................... 246/169 R
[51] Int. Cl. .................................................... B61l 3/10
[50] Field of Search .................................... 246/169 A,
 169 D

[56] References Cited
 UNITED STATES PATENTS
3,244,875 4/1966 Crane et al. .................. 246/169 D
3,402,290 9/1968 Blackstone et al. ........... 246/196 D FOREIGN PATENTS
1,131,254 6/1962 Germany ...................... 246/169 D Primary Examiner—Richard E. Aegerter
Assistant Examiner—I. Kenneth Silverman
Attorney—Kane, Dalsimer, Kane, Sullivan and Kurucz ABSTRACT: An alarm circuit monitor for use with railroad car hot box detection equipment is provided. The monitor, which is connected to hot box detectors adapted to generate signals responsive to the temperature of the bearings on both sides of each axle of a railroad car under consideration, includes a first circuit adapted to trigger an alarm in the event the signal responsive to the operating temperature of either bearing exceeds a threshold level for normally low running temperature bearings and a cancellation circuit to prevent the first circuit from triggering the alarm if the operating temperature of the other bearing also exceeds the low level threshold. A second circuit independent of the first circuit is also connected to the hot box detectors to trigger the alarm in the event the hot box detector signal exceeds a threshold level for normally high running temperature bearings.

PATENTED DEC 21 1971

INVENTOR
CORNELIUS A. GALLAGHER

BY
Kane, Dalsimer, Kane, Sullivan & Kurucz
ATTORNEYS

INVENTOR
CORNELIUS A. GALLAGHER

3,629,572

HOT BOX DETECTOR ALARM MONITOR

BACKGROUND OF THE INVENTION

The present invention relates to an improvement in equipment for the detection of hot boxes in railroad trains.

Railroad cars are generally provided with either friction or roller bearings although both bearings on any particular axle must be of the same type. Since normally operating roller bearings appear to hot box detectors to run hotter than normally operating friction bearings, some difficulty has heretofore been encountered by hot box detection equipment in differentiating between an overheated friction bearing and a properly operating roller bearing. While it would be desirable to actuate an alarm at the lowest level to insure early detection of friction bearing overheating, normally operating roller bearings could produce such alarm signal levels and excessive train stoppage would result in the absence of monitoring for such signals.

Thus, it is the principle object of the present invention to provide an improved alarm monitor designed to utilize both differential and absolute alarm principles to enable alarm actuation at the earliest signal level indicative of friction bearing overheating without decreasing train stop efficiency due to false readings caused by roller bearings.

SUMMARY OF THE INVENTION

The above and other beneficial objects and advantages are attained in accordance with the present invention by providing an alarm monitor circuit adapted to receive electrical signals from rail detectors responsive to the operating temperature of the bearings on both sides of an axle of a railroad car under observation. The monitor includes first alarm triggering circuit means coupled to the output of each rail detector which is adapted to trigger an alarm in the event a temperature representative of a hot box condition for a friction bearing is detected in either bearing and means for cancelling the alarm in the event the other bearing on the same axle is also operating at a level above that of a normally operating friction bearing as determined by measuring the differential between the operating temperature of the other bearing and a known reference. A second alarm triggering circuit is also provided which triggers the alarm in the event that either bearing is operating at a temperature indicative of a hot box condition in a roller bearing.

DETAILED DESCRIPTION OF THE PREFERRED EMBODIMENT

Figure 1:
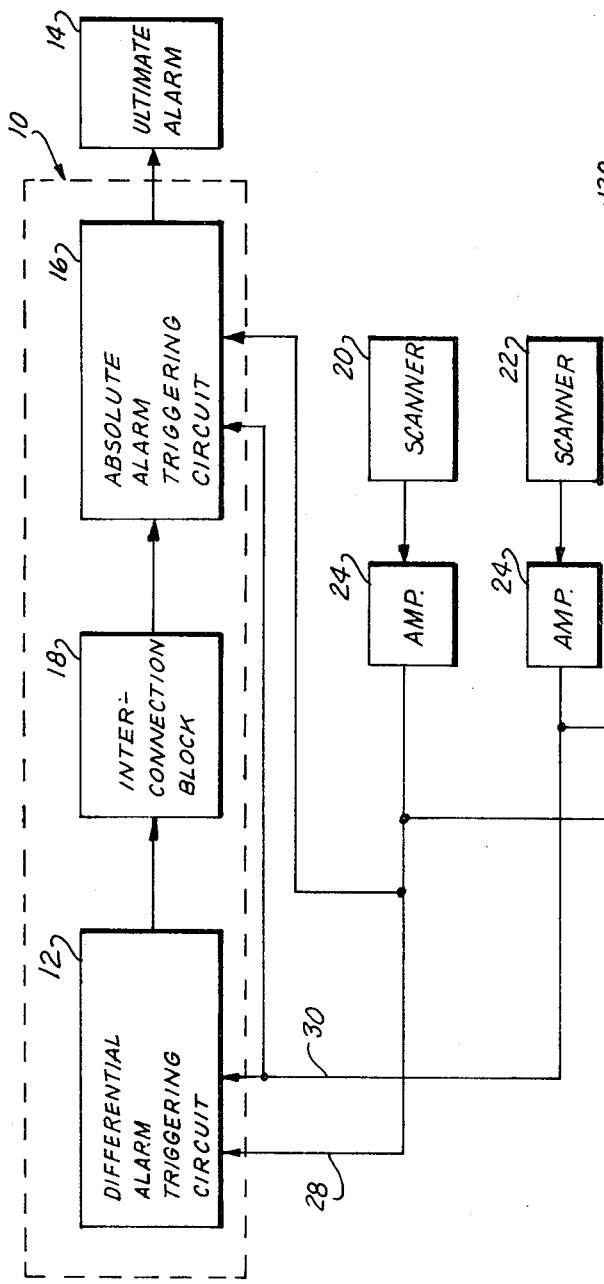
FIG. 1 is a block diagram representation of the alarm monitor of the present invention.

The present invention is illustrated in the accompanying drawings wherein similar components bear the same reference numerals throughout the several views. Reference is now made to FIG. 1 in particular wherein the circuitry of the present invention is shown in block diagram form. Thus, the alarm monitor 10 comprises a differential alarm triggering circuit 12 which serves to trigger an alarm 14 through an absolute alarm triggering circuit 16 to which it is connected via the interconnection block 18. The ultimate alarm 14, which does not comprise a portion of the present invention, may be of any convenient form such as audio, visual, or a combination thereof. Both the differential circuit 12 and absolute circuit 16 receive input signals from temperature responsive scanners which are associated with each rail of track in such a manner that they substantially simultaneously detect the temperature conditions of the bearings on both sides of each axle of a passing train and generate electrical signals in response thereto. Such scanners are commonly known as hot box detectors and utilize infrared detection elements. Thus, scanner 20 would be associated with one rail of a track and scanner 22 with the other rail. The output of each scanner, after suitable amplification through amplifiers 24, is fed into each of the triggering circuits. The outputs of amplifiers 24 are also recorded, usually on a strip-chart-type recorder 26 so that it is common in the railroad industry to refer to the signal strength of the rail scanners in terms of the displacement of the associated line on the strip chart.

As was previously mentioned today's railroad car wheels are generally provided with either friction bearings or roller bearings and the same car may have both types of wheels although any particular axle on the car must have the same type of bearing on both sides. Because of the heat dissipation characteristics of roller bearings, they appear, to infrared hot box detectors, to normally run at temperatures that would correspond to the hot box condition temperatures of friction bearings. In this regard, a strip chart displacement for a normally operating friction bearing would not generally exceed 3 mm. while the strip chart displacement for a normally operating roller bearing would be greater than 3 mm. and could be as high as 7 mm. Also, a 7 mm. displacement for a friction bearing would indicate a hot box condition while a displacement on the order of 14 mm. would be necessary to indicate a hot box condition in a roller bearing. It should, thus, be obvious that if single scanners are to be utilized for both friction and roller bearings, means must be provided for monitoring the output signals of scanners 20 and 22 to distinguish between the signals generated by overheated friction bearings and properly operating roller bearings in order to prevent unnecessary train stoppage. This is attained in accordance with the present invention by reliance on the statistical observation that very rarely do overheated bearings occur on opposite sides of the same axle so that by comparing the signals generated on both sides of each axle a distinction can be made between the signals of overheated friction bearings and normally operating roller bearings.

DIFFERENTIAL ALARM

Figure 2:
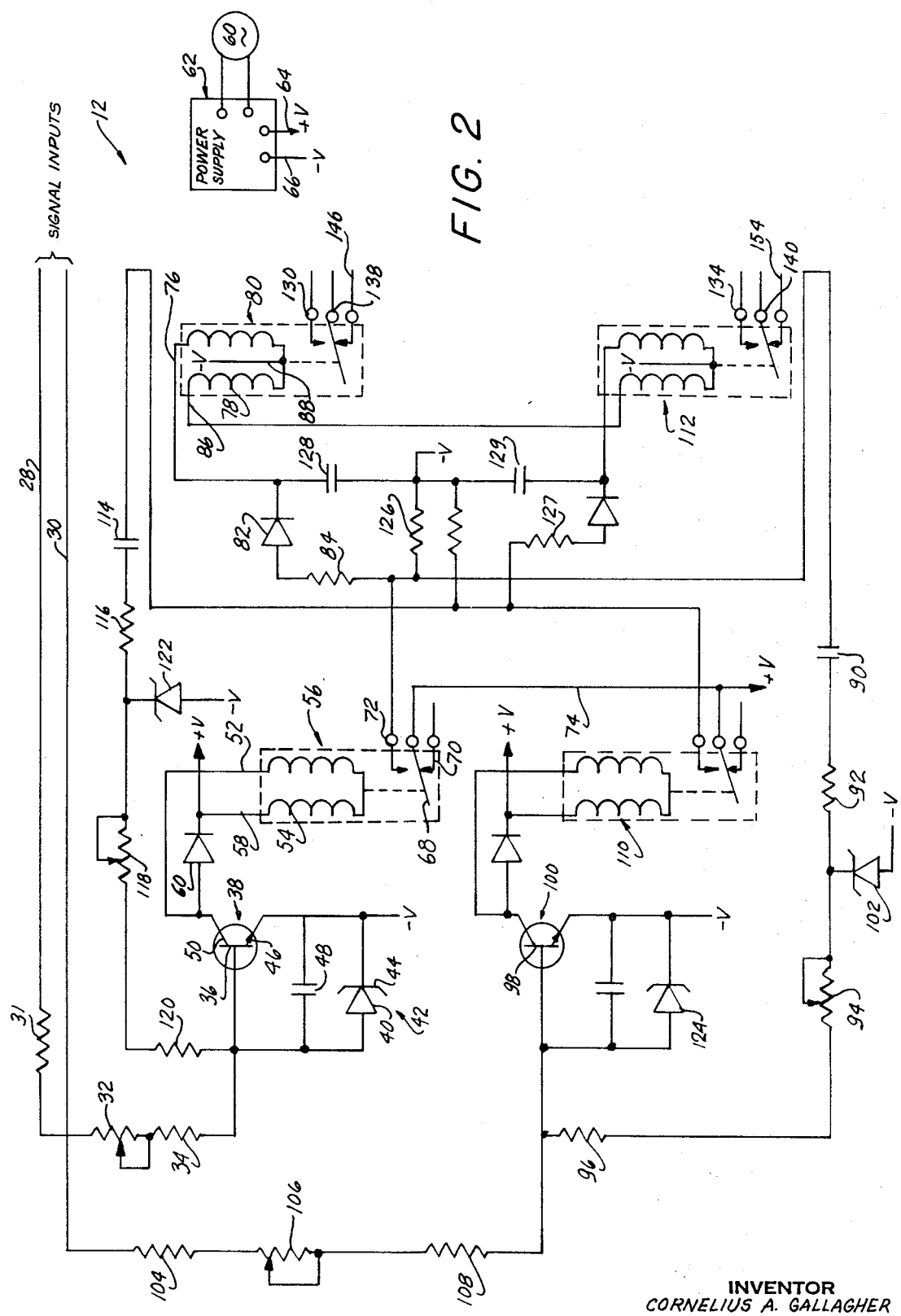
FIG. 2 is a schematic drawing of the differential alarm triggering circuit.

Referring now to FIG. 2 it is first noted that the differential alarm triggering circuit 12 comprises two identical subcircuits. The input 28 to one circuit comprises the amplified output of scanner 20 and the input 30 to the other circuit comprises the amplified output of scanner 22. Input 28 is fed through resistor 31, potentiometer 32 and resistor 34 to the base 36 of transistor 38 and the anode 40 of tunnel diode 42. The cathode 44 of diode 42 is connected to the emitter 46 of transistor 38 and a capacitor 48 is shunted across diode 42. The collector 50 of transistor 38 is connected to one terminal 52 of the coil 54 of relay 56. The other terminal 58 of coil 54 is connected to a positive voltage source and isolated from collector 50 by diode 60. The emitter 46 of transistor 38 is connected to a negative voltage source so that when transistor 38 becomes conductive relay 54 is activated.

The power for the unit is provided by power supply 62 which rectifies line voltage and has taps 64 and 66 which are respectively positive and negative with respect to earth ground.

Relay 56 includes a normally down, pivotal center contact 68 which is in electrical contact with terminal 70 when coil 54 is inactive and lifted into contact with terminal 72 when coil 54 is actuated. The center contact 68 is connected to the positive voltage tap through lead 74. Terminal 72 is connected to one terminal 76 of the coil 78 of relay 80 through diode 82 and resistor 84. As will be noted, the coil 78 of relay 80 includes terminals 76, 86 and 88 and may be activated by a voltage drop between terminal 88 and either terminal 76 or 86.

Contact 72 of relay 56 is also connected through capacitor 90, resistor 92, potentiometer 94 and resistor 96 to the base 98 of transistor 100. A zener diode 102 is connected to the junction of resistor 92 and potentiometer 94 and the anode of diode 102 is connected to the negative voltage tap.

In a manner identical to that described above, the output 30 of scanner 22 is connected through resistor 104, potentiometer 106 and resistor 108 to the base 98 of transistor 100. It should be noted that a circuit identical to that described above to receive the output 28 of scanner 20 is provided to receive the output 30 of scanner 22. This circuit includes transistor 100 which is identical to transistor 38, relay 110 which is analogous to and identical to relay 56, relay 112 which is identical to and analogous to relay 80 and capacitor 114, resistor 116, potentiometer 118 and resistor 120 which are analogous to components 90, 92, 94 and 96 respectively and which are connected in series to the base 36 of transistor 38. Zener diode 122 is analogous to zener diode 102 and tunnel diode 42.

ABSOLUTE ALARM

Figure 3:
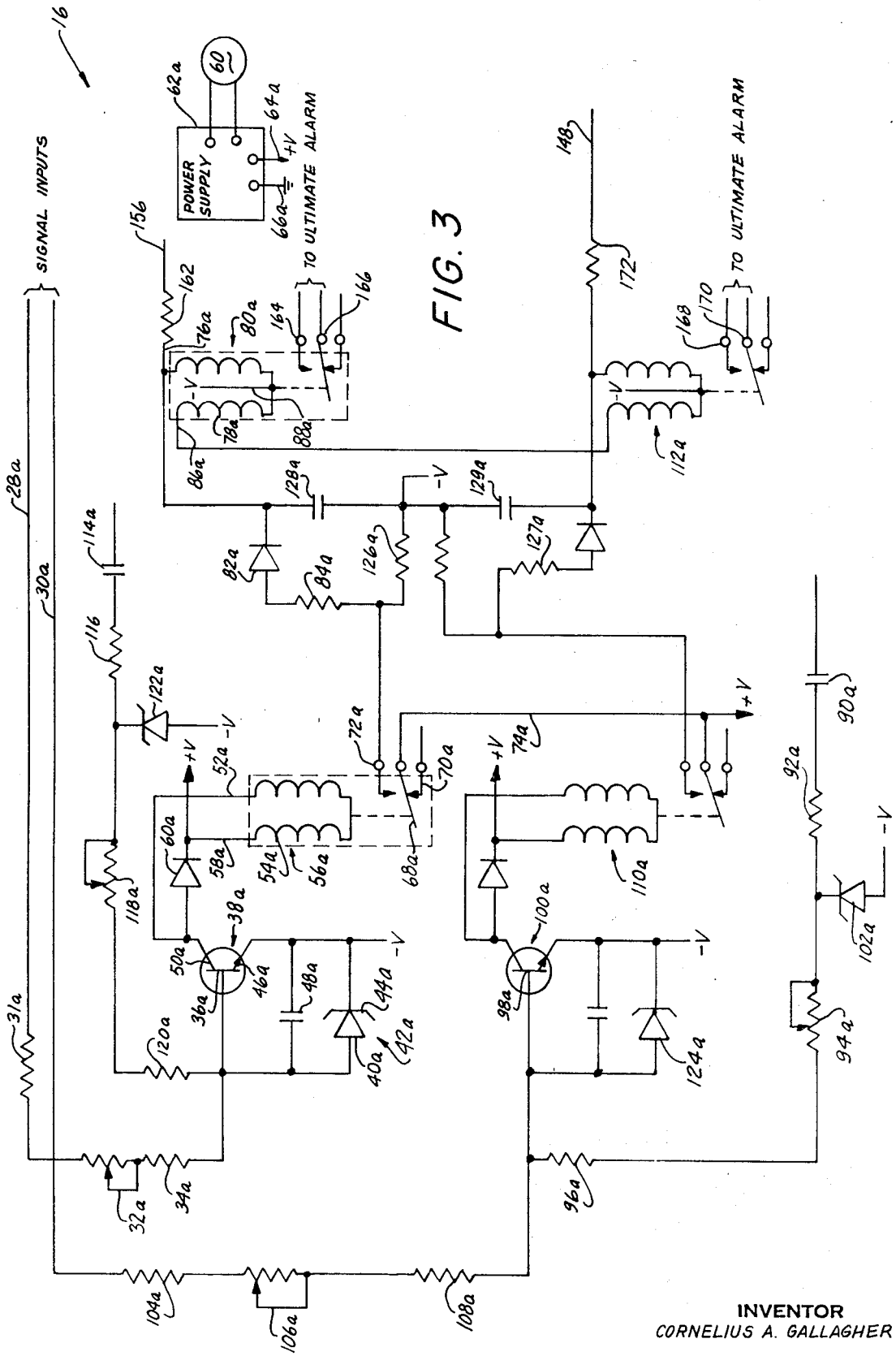
FIG. 3 is a schematic drawing of the absolute alarm triggering circuit.

Referring briefly to FIG. 3 it is noted that the absolute alarm triggering circuit 16 is substantially identical to the differential alarm triggering circuit with the sole exceptions being that the negative terminal of the power supply is grounded rather than being at a negative potential with respect to earth ground and that the interconnections differ somewhat. For this reason, and in the interest of clarity, reference numerals identical to those of FIG. 2 have been applied to FIG. 3 with the suffix *a* applied to differentiate between the two. The interconnection differences which relate primarily to the manner of connecting the terminals of relays 80, 112, 80*a*, and 112*a* will be described in conjunction with the following description of the operation of the total monitor.

OPERATION, CANCELLATION CIRCUIT AND INTERCONNECTIONS

The operation of the monitor circuit 10 of the present invention is as follows. Potentiometers 32 and 106 of the differential triggering circuit 12 are first adjusted so that the tunnel diodes 42 and 124 respectively will fire in the event the signal 28 or 30 from scanner 20 or 22 reaches a predetermined level sufficiently high to indicate a hot box condition in a friction bearing. For example, and for purposes of the remaining description, this level may be 7 mm. Similarly, potentiometers 32*a* and 106*a* of the absolute alarm circuit 16 are adjusted so that tunnel diodes 42*a* and 124*a* respectively will fire in the event the scanner output constitutes a signal level corresponding to a hot box condition in a roller bearing which, for example, and for purposes of this discussion will be 14 mm.

Assume first that an axle containing normally operating friction bearings is detected by scanners 20 and 22. As was previously mentioned, the signal generated by normally operating friction bearings is below 3 mm. and thus, the state of both the differential alarm circuit 12 and absolute alarm circuit 16 remains the same and no alarm is sounded as the axle passes the scanners.

Assume next that the first scanner to detect the next axle generates a signal of above 7 mm. and below 14 mm. This could mean either that a normally operating roller bearing has been detected or that a friction bearing with a hot box has been detected. For convenience assume that scanner 20 has detected this bearing. The output 28 of scanner 20 will thus be above 7 mm. which is sufficient to fire tunnel diode 42 so that its impedance becomes very high and transistor 38 is driven to saturation. When transistor 38 is driven to saturation the circuit for coil 54 of relay 56 is closed through the emitter and collector of transistor 38 thereby lifting relay 56 and connecting its center contact 68 with its front contact 72. With relay 56 in this lifted condition the circuit of coil 78 of relay 80 is closed through terminal 76, diode 82, resistor 84, contacts 72 and 68 of relay 56, and lead 74 thereby lifting relay 80. The filter formed of resistor 126 and capacitor 128 insures relay 80 remaining lifted for a sufficient time for the remaining operations to be described to be completed. Due to the symmetry of the circuits associated with scanners 20 and 22 if scanner 22 had first detected a signal above 7 mm. relays 110 and 112 would have lifted in the manner described above through their analogous elements. The filter formed of resistor 127 and capacitor 129 serves the same function for the circuit associated with scanner 22.

Simultaneously with the closing of relay 56 and the resulting lifting of relay 80, positive voltage is applied through contact 68 and 72 of relay 56 to zener diode 102 through capacitor 90 and resistor 92. Prior to this time potentiometer 94 was adjusted so that the signal at the base 98 of transistor 100 due to the zener diode firing is equivalent to a desired differential as, for example, that of a 4 mm. signal from the scanner. The signal 30 in response to the temperature detected by scanner 22 also appears at the base of transistor 100. If the axle under observation by scanners 20 and 22 contains friction bearings then signal 30 would be below 3 mm. since a normally operating friction bearing generates a signal below 3 mm. and hence the total signal to the base 98 of transistor 100 would not be sufficient to cause relay 110 and hence 112 to lift. If on the other hand a roller bearing were under observation, the output 30 of scanner 22 would exceed 3 mm. so that the total signal at the base of transistor 98 comprising scanner signal 30 combined with the check signal produced by zener diode 102 through potentiometer 94 would be sufficient to lift relay 110 even if the temperature of that bearing were not sufficiently high to generate a 7 mm. signal.

Figure 4:
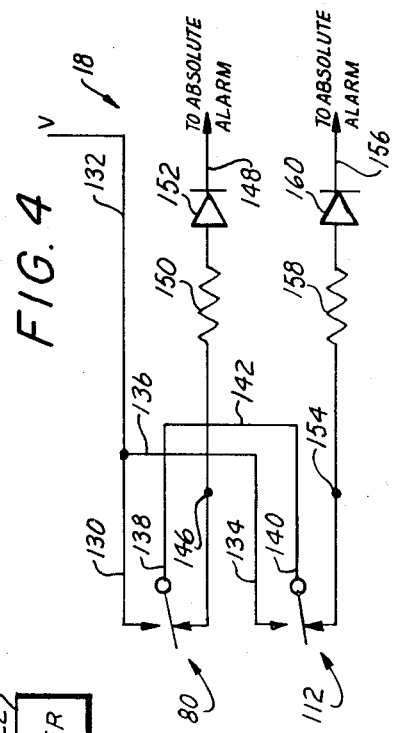
FIG. 4 is an interconnection diagram between the circuits of FIGS. 2 and 3.

Referring now briefly to FIG. 4 it is noted that the front contact 130 of relay 80 is connected to the positive voltage supply through lead 132 and is also connected to the front contact 134 of relay 112 through lead 136. The center contacts 138 and 140 of relays 80 and 112, respectively, are connected to one another through lead 142. The bottom contact 146 is connected to an input 148 of the absolute alarm through resistor 150 and diode 152, and the back contact 154 of relay 112 is connected to an input 156 to the absolute alarm through resistor 158 and diode 160. Thus, it should be obvious that if both relays 80 and 112 of the differential alarm are lifted no signal appears at either absolute alarm input 148 or 156. However, if one relay (80 or 112) is lifted and the other relay remains down, a signal will be transmitted to the absolute alarm through the down relay. Thus, if relay 80 is lifted and relay 112 stays down, the positive voltage will appear on lead 154 and if relay 112 is lifted and 80 stays down, the positive voltage will appear on lead 148. Referring now to FIG. 3 it is noted that when the positive voltage appears on lead 156 of the absolute alarm, relay 80*a* of the absolute alarm is lifted by virtue of the coil 78*a* being actuated through resistor 162 and lead 76*a*. With relay 80*a* lifted the circuit to the ultimate alarm is closed through contacts 164 and 166 of relay 80*a*. Alternatively, the circuit to the ultimate alarm can be closed through contacts 168 and 170 of relay 112*a* when that relay is lifted by virtue of the positive voltage being applied to the coil of relay 112*a* through lead 148 and resistor 172.

Potentiometers 32*a* and 106*a* of the absolute alarm are adjusted so that a signal indicative of a hot box in a roller bearing (i.e. a 14 mm. signal in our example) is required to saturate the associated transistors 38*a* and 100*a* respectively. Since the circuit between contact 72*a* of relay 56*a* and capacitor 90*a* is opened, no check signal is applied to the base of transistor 100*a* when relay 56*a* is lifted. Similarly when relay 110*a* is lifted no check signal is applied to the base of transistor 38*a*. Thus, if the output 28 or 30 of either rail scanner reaches 14 mm., transistor 38*a* or 100*a* will become saturated thereby lifting relay 56*a* or 110*a* which in turn will cause either relay 80*a* or 112*a* to lift and close the ultimate alarm circuit as described above. Since there is no interconnection between the symmetrical circuits of the absolute alarm, there can be no cancellation so that once a signal exceeding 14 mm. is generated by either scanner the ultimate alarm is triggered, regardless of the signal level of the other scanner.

Thus, in accordance with the above description an alarm monitoring circuit is provided for use with hot box detection scanners associated with each rail of a track which will close an alarm circuit in the event that either rail detector detects a bearing temperature corresponding to a hot box condition for a roller bearing or if one detector detects what could be a hot box condition for a friction bearing on one rail and the other rail detects a normally operating friction bearing. The alarm monitor will automatically cancel the alarm circuit in the event that both bearings are above the hot box range for friction bearings but neither bearing is above the hot box range for roller bearings thereby indicating normally operating roller bearings.

Having thus described my invention, what is claimed is:

1. An alarm circuit monitor for use with apparatus of the type adapted to generate first and second electrical signals respectively responsive to the operating temperatures of the bearings on both sides of an axle of a railroad car having axles provided with either normally high running temperature bearings or normally low running temperature bearings comprising:
    a. first circuit means connected to the output of said apparatus and adapted to trigger an alarm in the event the signal responsive to the operating temperature of either bearing exceeds a first level corresponding to the level of a signal responsive to an overheated normally low running temperature bearing said first circuit means includes two first relays each connected to one of the outputs of said apparatus, means interposed between said first relays and said apparatus adapted to receive said first and second signals from said apparatus and to actuate the associated first relay in the event said first or second signal exceeds said first level and two second relays each operatively connected to one of said first relays and adapted to be actuated when the associated first relay is actuated;
    b. cancellation circuit means connected to said first circuit means and adapted to cancel said alarm triggering in the event the signals responsive to the operating temperature of both said bearings exceeds said first level; and
    c. second circuit means connected to the output of said apparatus and adapted to trigger an alarm independent of said first circuit means in the event the signal responsive to the operating temperature of either bearing exceeds a second level corresponding to the signal level responsive to an overheated normally high running temperature bearing.

2. The invention in accordance with claim 1 wherein each of said second relays includes a first fixed contact connected to an alarm, a second fixed contact connected to a power supply for said alarm, and a third contact shiftable on actuation of said relay from a first position in electrical contact with said first contact to a second position in electrical contact with said second contact and further comprising connecting means extending between the third contact of each of said second relays whereby said alarm is triggered only in the event that one of said second relays is actuated and the other of said second relays is not actuated.

3. The invention in accordance with claim 1 further comprising check signal generating means associated with each of said first relays, each of said generating means having an output connected to the interposed actuating means of the associated first relay and an input operatively connected to the opposite first relay whereby the actuation of one of said first relays by one of said apparatus signals causes the check signal and other apparatus signal to appear at the relay actuation means associated with the other first relay.

4. The invention in accordance with claim 3, wherein each of said first relays includes a coil and each of said interposed actuation means includes a transistor switch having a collector and emitter in series in the associated relay coil actuating circuit and a base connected to the associated output of said apparatus and to the output of the associated signal generating means.

5. The invention in accordance with claim 4, wherein each of said check signal generating means includes a zener diode extending between a voltage supply and the base of the associated transistor switch and means for firing said diode connected to the other first relay whereby the actuation of said other first relay applies the breakdown voltage to said zener diode.

6. The invention in accordance with claim 5 further comprising: (a) a tunnel diode associated with each of said relays extending between a voltage supply and the juncture of said transistor base and said outputs; (b) a variable resistance element interposed between said apparatus output and said juncture; and (c) a variable resistance element interposed between the associated signal generator output and said juncture whereby the adjustment of said variable resistance elements determine the magnitude of the signals necessary to activate said relay.

* * * * *